United States Patent
Chua et al.

(10) Patent No.: US 6,490,875 B2
(45) Date of Patent: Dec. 10, 2002

(54) REGENERATIVE ADSORPTION PROCESS AND MULTI-REACTOR REGENERATIVE ADSORPTION CHILLER

(75) Inventors: Hui Tong Chua, Singapore (SG); Kim Choon Ng, Singapore (SG); Abdul Malek, Singapore (SG); Takao Kashiwagi, Singapore (SG); Atsushi Akisawa, Singapore (SG); Bidyut Baran Saha, Singapore (SG)

(73) Assignee: The National University of Singapore, Singapore (SG)

( * ) Notice: Subject to any disclaimer, the term of this patent is extended or adjusted under 35 U.S.C. 154(b) by 0 days.

(21) Appl. No.: 09/875,922

(22) Filed: Jun. 8, 2001

(65) Prior Publication Data

US 2002/0053217 A1 May 9, 2002

Related U.S. Application Data

(63) Continuation of application No. PCT/SG99/00136, filed on Dec. 6, 1999.

(51) Int. Cl.⁷ .............................. F25B 17/00; F25B 17/08
(52) U.S. Cl. ............................................ 62/144; 62/480
(58) Field of Search ........................... 62/480, 79, 105, 62/106, 141, 142, 144, 148, 146, 476, 481

(56) References Cited

U.S. PATENT DOCUMENTS

| | | | | |
|---|---|---|---|---|
| 4,548,046 A | * | 10/1985 | Brandon et al. ............... 62/79 |
| 4,881,376 A | * | 11/1989 | Yonezawa et al. ............ 62/106 |
| 5,360,057 A | * | 11/1994 | Rockenfeller et al. .... 62/480 X |
| 5,463,879 A | * | 11/1995 | Jones .......................... 62/480 |
| 5,664,427 A | * | 9/1997 | Rockenfeller et al. .... 62/480 X |
| 5,823,003 A | * | 10/1998 | Rosser, Jr. et al. ........... 62/144 |
| 6,041,617 A | * | 3/2000 | Sanada et al. ................ 62/480 |

FOREIGN PATENT DOCUMENTS

JP          05126431       * 5/1993

* cited by examiner

*Primary Examiner*—Chen-wen Jiang
(74) *Attorney, Agent, or Firm*—Birch, Stewart, Kolasch & Birch, LLP

(57) ABSTRACT

A regenerative adsorption process and a multi-reactor regenerative adsorption chiller assembly including a condenser adapted to receive a coolant from a source; an evaporator connected to the condenser to provide a refrigerant circuit; a plurality of reactors, each being able to operate in adsorption and desorption modes and having a coolant inlet to directly or indirectly receive coolant when operating in adsorption mode before, after or simultaneous with the condenser, and a waste heat inlet for directly or indirectly receiving waste heat from a waste heat source when operating in desorption mode; and control means for controlling said plurality of reactors such that each reactor alternately operates in adsorption and desorption modes for substantially identical time intervals, and such that each reactor has an equal chance of being the first reactor to receive the coolant when operating in adsorption mode, and the waste heat from the waste heat source when operating in desorption mode.

21 Claims, 3 Drawing Sheets

REGENERATIVE ADSORPTION PROCESS AND MULTI-REACTOR REGENERATIVE
ADSORPTION CHILLER

This application is a continuation of PCT/SG99/00136, filed Dec. 6, 1999.

FIELD OF THE INVENTION

This invention relates to a regenerative adsorption process and an adsorption chiller designed for utilising waste heat typically having a temperature of below about 150° C. for useful cooling.

BACKGROUND OF THE INVENTION

Two-reactor adsorption chillers have already been successfully commercialised in Japan [1,2]. By making use of a silica gel-water working pair, such chillers have managed to economically harness the potential of low-grade waste heat for useful cooling before it is discharged into the environment. Insofar as adsorption chillers are concerned, some methods have been devised to improve the conversion efficiency of the potential waste heat to useful cooling. For example, schemes have been proposed where such waste heat is used serially in a string of adsorption chillers before it is finally discharged. As another example, a scheme has previously been proposed where the desorption temperature is significantly reduced by means of multi-stage thermal compression of the refrigerant vapour [3]. This enables waste heat to be further utilized before it is finally purged to the environment. From the trend of development of the prior art, it would be desirable to further improve the conversion efficiency so that maximum cooling capacity can be derived from a given hardware investment, waste heat and coolant flow rate.

Of equal importance is the need for a stable chilled water outlet temperature. Based on experimental measurement on a commercially available 10 kW two-reactor adsorption chiller, under a typical dynamic steady state operation, the chilled water outlet temperature generally fluctuates by ±1.5° C. [4]. While such fluctuation may be acceptable for sensible cooling and rough process cooling requirements, it begins to pose a problem in dehumidification, and other stringent cooling applications. In the latter field of usage, vapour compression or absorption cooling devices have been employed downstream to attenuate the temperature oscillation. It would therefore be desirable to provide a smoother chilled water outlet temperature so that downstream temperature smoothening devices could be downsized or even eliminated.

Sato et al. [5–6] have proposed a multi-reactor strategy involving cooling the adsorber with refrigerant emanating from one or more evaporators. It may be desirable and more practical to have the evaporator devoted to cooling the chilled water, with the evaporated refrigerant being superheated at the adsorbers. Master-and-slave configuration is commonly found in these references for the arrangement of the reactors. Such master-and-slave configurations for the string of reactors may represent an under-utilization of downstream reactors. It would therefore be attractive to eliminate such rigid configuration.

Many other designs [7–14] employ re-circulating fluid to boost the chiller's coefficient of performance. These arrangements are designed for use with a high temperature heat source, which is usually economically valuable; they are done at the expense of a lower firing temperature for the desorber and a higher cooling temperature for the adsorber. In the case of low temperature (typically 150° C. or below) waste heat application, such a strategy may not be feasible. In this case, the objective would then be to maximise the cooling throughput of the chiller.

The present invention advantageously improves the recovery efficiency of waste heat to useful cooling. Recognizing that cooling water for the adsorber and condenser is a scarce resource, the invention aspires to achieve maximum cooling capacity for a given flow rate of waste heat and cooling stream. This advantageously also ensures maximum conversion efficiency of waste heat to useful cooling and reduces piping material for a given cooling capacity.

Advantageously, the invention also makes it possible to downsize or even eliminate the need for downstream temperature smoothening devices by providing a more stable chilled water outlet temperature.

Further, the invention advantageously reduces the risk of ice formation by providing for a sequential start-up of the reactor or reactors when the chiller is activated.

SUMMARY OF THE INVENTION

According to one aspect of the invention there is provided a regenerative adsorption process for application in an adsorption assembly comprising a condenser, an evaporator and a plurality of reactors each alternately operating in adsorption and desorption modes, said process comprising:

passing a coolant through the condenser;
passing the coolant emanating from the condenser through reactors operating in adsorption mode; and
passing waste heat from a waste heat source through reactors operating in desorption mode; wherein said plurality of reactors are scheduled such that each reactor alternately operates in adsorption and desorption modes for substantially identical time intervals, and such that each reactor has an equal chance of being the first reactor to receive the coolant emanating from the condenser when operating in adsorption mode, and the waste heat from the waste heat source when operating in desorption mode.

According to another aspect of the invention there is provided a multi-reactor regenerative adsorption chiller assembly comprising:

a condenser adapted to receive a coolant from a source;
an evaporator connected to said condenser to provide a refrigerant circuit;
a plurality of reactors, each being able to operate in adsorption and desorption modes and having a coolant inlet to directly or indirectly receive coolant emitted from said condenser when operating in adsorption mode, and a waste heat inlet for directly or indirectly receiving waste heat from a waste heat source when operating in desorption mode; and control means for controlling said plurality of reactors such that each reactor alternately operates in adsorption and desorption modes for substantially identical time intervals, and such that each reactor has an equal chance of being the first reactor to receive the coolant emanating from the condenser when operating in adsorption mode, and the waste heat from the waste heat source when operating in desorption mode.

The reactors operating in adsorption mode may be arranged in series and/or in parallel depending upon the particular operation, and also depending on the total number of reactors being used. However, the reactors operating in desorption mode are arranged in series.

In a preferred embodiment, the plurality of reactors comprises an even number of reactors, wherein at substantially any instant during the process, half of the plurality of reactors operate in adsorption mode and the other half of the plurality of reactors operate in desorption mode. Most preferably, the plurality of reactors comprises at least four reactors.

The flow rate of coolant and waste heat through the plurality of reactors operating in adsorption and desorption modes respectively maybe any suitable flow rate depending on the particular size of chiller assembly and design of heat exchangers. Preferably, the coolant is flowed through the reactors operating in adsorption mode at a suitable flow rate. A suitable flow rate is preferably any flow rate that result in a transition or turbulent flow regime in the channel of a heat exchanger, be it the chilled water, coolant and/or heat source. When the plurality of reactors comprises four or more reactors, the flow rate of coolant through reactors operating in adsorption mode is preferably at the suitable flow rate, irrespective of whether the reactors operating in adsorption mode are arranged in series or in parallel. Sizing and flow rates can be determined by those who are skilled in the art.

The waste heat is preferably flowed through the reactors operating in desorption mode at a suitable flow rate. More preferably, where the plurality of reactors comprises four or more reactors, the flow rate of waste heat through reactors operating in desorption mode is also sized at the suitable flow rate.

Similarly, the flow rate of coolant through the condenser may be determined for a specific application of the invention. It will be recognised that the flow rate of coolant through the reactors operating in adsorption mode will be somewhat dependent on the flow rate of coolant through the condenser. In a preferred embodiment, the flow rate of coolant through the condenser is at a suitable flow rate as described above.

As discussed above, the adsorption assembly comprises a condenser, an evaporator and a plurality of reactors, each of which alternatively operates in adsorption and desorption modes. In a preferred embodiment, the plurality of reactors are arranged in series such that, in use, reactors operating in adsorption mode constitute a first sub-series of reactors connected in series and/or in parallel to receive coolant from the condenser and reactors operating in desorption mode constitute a second sub-series of reactors connected in series to receive waste heat from the waste heat source.

Each reactor is preferably composed of heat exchanging material and contains adsorbents. The adsorbent could be any material, such as silica gel, that is able to adsorb, either by physisorption and/or chemisorption refrigerant, for example water vapour, ammonia, or methanol at a typical cooling tower temperature and desorb refrigerant at moderately low temperature (typically 150° C. or below). The coolant from a cooling tower is first passed through the condenser and subsequently to each of the reactors operating in adsorption mode either in series or in parallel. The waste heat source is passed serially from one reactor operating in desorption mode to another reactor in the same mode. After passing through the last reactor operating in desorption mode, the waste heat is purged from the system.

The reactors are scheduled such that each reactor alternately operates in adsorption and desorption mode for substantially the same time interval, and that each reactor has equal chance of being the first reactor to either receive the coolant emanating from the condenser or the waste heat. Such a schedule ensures that maximum smoothening of chilled water outlet temperature is achieved. This arrangement also facilitates maximum extraction of energy from the waste heat to maximise cooling capacity. Cooling the condenser first and then the reactors operating in adsorption mode ensures that minimum coolant flow rate is used.

BRIEF DESCRIPTION OF THE DRAWINGS

The accompanying drawing which is incorporated into and constitutes apart of the description of the invention, illustrates an embodiment of the invention and serves to explain the principles of the invention. It is to be understood, however, that the drawing is designed for purposes of illustration only, and not as a definition of the limits of the invention.

DESCRIPTION OF THE EMBODIMENTS OF THE INVENTION

Figure 1:
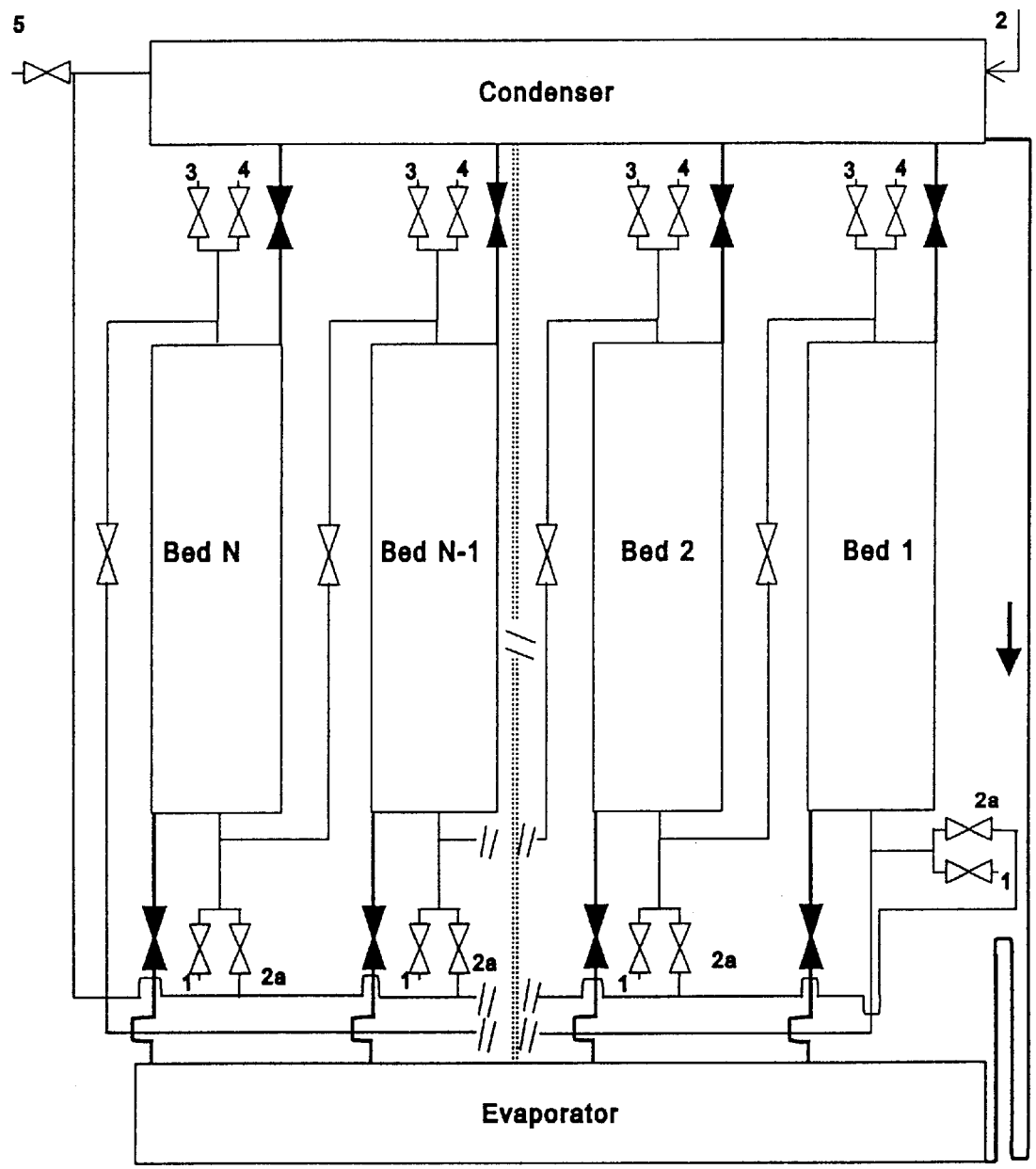
FIG. 1 is a schematic of one embodiment of an adsorption chiller constructed according to the present invention showing the operation of the multi-reactor regenerative strategy. Fluid flow between reactors has been depicted as top-down. 1 refers to waste heat stream inlet, 2 refers to coolant inlet, 2a refers to coolant inlet to the reactor, 3 refers to waste heat stream outlet, 4 refers to coolant outlet, and 5 refers to the outflow of excess coolant. The bold lines depict the refrigerant circuit, while the thin lines depict the coolant and heat source circuit. $-\triangleright\triangleleft-$ indicates either a manual or electromagnetic on/off valve.

In detail now and referring to the drawings, FIG. 1 illustrates one embodiment of the multi-reactor regenerative adsorption chiller assembly of the present invention. The N-reactor regenerative adsorption chiller consists of N reactors, where N is even to achieve optimal chilled water outlet temperature smoothening, a condenser and an evaporator.

In general, N/2 reactors operate under adsorption mode, while the other N/2 reactors operate under desorption mode at any instant of use of the adsorption chiller. Coolant from a cooling source enters the condenser at location 2 and travels through the condenser. Subsequently, the coolant enters one or more reactors operating under adsorption mode through valve(s) 2a, depending on whether the reactors are arranged in parallel or in series. A rated amount of coolant flows through the reactors operating under adsorption mode, and is eventually purged from port(s) 4. Excess coolant from the condenser is removed from port 5.

Heat source is introduced at any one port 1 and flows serially through all the N/2 reactors operating under desorption mode and is purged from a port 3. The reactors are scheduled such that each reactor alternately operates in adsorption and desorption mode for the same half-cycle time interval, and that each reactor has equal chance of being the first reactor to either receive the coolant emanating from the condenser through port 2a or the waste heat through valve 1. The energy schedules may be best understood by referring to the following tables:

TABLE 1

The following table illustrates the general schedule for a series-cooled 4-reactor system. Energy utilization schedule for a 4-reactor chiller

| Reactor 1 | sw | ads (2) | ads (1) | sw | des (2) | des (1) |
| Reactor 2 |    | des (1) | sw      | ads (2) | ads (1) | sw | des (2) |
| Reactor 3 | sw | des (2) | des (1) | sw | ads (2) | ads (1) |
| Reactor 4 |    | ads (1) | sw      | des (2) | des (1) | sw | ads (2) |

Legend:
ads: reactor operating in adsorption mode (adsorber)
des: reactor operating in desorption mode (desorber)
sw: switching from adsorber to desorber, and receiving heating stream from des(1) or switching from desorber to adsorber, and receiving cooling stream from ads(1)
(1): this refers to the situation when the reactor receives either cooling stream from the condenser or heating stream directly from the heat source.
(2): this refers to the situation when the reactor receives either cooling stream from ads(1) or heating stream from des(1).
Note:
The width of each box is an indication of the relative time duration over one cycle.

The cooresponding schedule for a parallel-cooled, 4-reactor system can be inferred from the table.

TABLE 2

The following table illustrates the general schedule for a series- or and parallel-cooled 6-reactor system.
Two possible energy utilization schedules for a six-reactor chiller

| Reactor 1 | sw | ads(3) | ads(2) | ads(1) | sw | des(3) | des(2) | des(1) |
| Reactor 2 |    | des(1) | sw | ads(3) | ads(2) | ads(1) | sw | des(3) | des(2) |
| Reactor 3 |    | des(2) | des(1) | sw | ads(3) | ads(2) | ads(1) | sw | des(3) |
| Reactor 4 | sw | des(3) | des(2) | des(1) | sw | ads(3) | ads(2) | ads(1) |
| Reactor 5 |    | ads(1) | sw | des(3) | des(2) | des(1) | sw | ads(3) | ads(2) |
| Reactor 6 |    | ads(2) | ads(1) | sw | des(3) | des(2) | des(1) | sw | ads(3) |

Legend:
ads: reactor operating in adsorption mode (adsorber)
des: reactor operating in desorption mode (desorber)
sw: switching from adsorber to desorber, and receiving heating stream from des(2). Or switching from desorber to adsorber, and receiving coolant from the condenser if it is a parallel cooling scheme, or receiving coolant from the ads(2) if it is a series cooling scheme.
(1): this refers to the situation when the reactor receives either cooling stream from the condenser or heating stream directly from the heat source.
(2): this refers to the situation when the reactor receives either cooling stream from ads(1) or heating stream from des(1).
(3): this refers to the situation when the reactor receives heating stream from des(2); and if it is a parallel cooling scheme, the reactor receives cooling stream directly from the condenser, whereas if it is a series cooling scheme, the reactor receives cooling stream from ads(2).
Note:
The width of each box is an indication of the relative time duration over one cycle.

As discussed above, parallel cooling of one or more of the reactors operating under adsorption mode may be possible. This will generally depend on the coolant flow rate through the condenser. Typically, parallel cooling of one or more of the reactors operating under adsorption mode is more practical for a system with six or more reactors.

TABLE 3

| Bed | | | | | | | | | |
|---|---|---|---|---|---|---|---|---|---|
| Bed 1 | sw | ads (N/2) | ads(N/2-1) | | sw | des (N/2) | des(N/2-1) | | des(2) | des(1) |
| Bed 2 | des(1) | sw | ads | | ads(1) | sw | des (N/2) | | des(3) | des(2) |
| Bed N/2 + 1 | sw | des (N/2) | des(N/2-1) | | sw | ads (N/2) | ads(N/2-I) | | ads(2) | ads(1) |
| Bed N/2 + 2 | ads(1) | sw | des (N/2) | | des(1) | sw | ads (N/2) | | ads(3) | ads(2) |
| Bed N-1 | ads(N/2-2) | ads(N/2-3) | | des(N/2-2) | des(N/2-3) | | sw | ads (N/2) | ads(N/2-1) |
| Bed N | ads(N/2-I) | ads(N/2-2) | | des(N/2-1) | des(N/2-2) | | des(1) | sw | ads (N/2) |

Legend:
ads: reactor operating in adsorption mode (adsorber)
des: reactor operating in desorption mode (desorber)
sw: switching from adsorber to desorber, and receiving heating stream from des(N/2-1). Or switching from desorber to adsorber, and receiving coolant from the condenser if it is a special parallel cooling scheme, or receiving coolant from the ads(N/2-1) if it is a series cooling scheme.
(1): this refers to the situation when the reactor receives either cooling stream from the condenser or heating stream directly from the heat source.
(I): where I < I < N/2, this refers to the situation when the reactor receives either cooling stream from ads(I-1) or heating stream from des(1-1).
(N/2): this refers to the situation when the reactor receives heating stream from des(N/2-I); and if it is a special parallel cooling scheme, the reactor receives cooling stream directly from the condenser, whereas if it is a series cooling scheme, the reactor receives cooling stream from ads(N/2-1).
Other than the special parallel cooling scheme mentioned above, a general parallel cooling scheme exists, where the cooling stream from the condenser separately services ads(1) to ads(J), where 1 < J < N/2, and ads(J + 1) to ads(K) where J < K ≦ N/2, and so on.
Note:
The width of each box is an indication of the relative time duration over one cycle.

In general, the schedule for an N-reactor chiller, where N is even, is shown in Table 1. In principle N could be odd, but this would not lead to optimal temperature smoothening of the outlet chilled water. The N-reactor system is advantageously devised to start-up sequentially. Specifically, during start-up, reactors operating under adsorption mode and reactors operating under desorption mode are preferably activated one at a time so that a sudden depression of the evaporator temperature is prevented thus reducing the risk of ice formation in the evaporator.

The following technical analysis is provided only to demonstrate the efficacy of the invention. This analysis has made use of certain specific technical specifications so as to quantitatively demonstrate the advantages of the invention. It is emphasised that other similar analyses based on different technical specifications and even different formalisms are possible. Hence, the associated specifications of the present analysis should not, in any way, be construed as restrictive on the present invention.

Specifcs of the analysis:
linear driving force (LDF) kinetic equation, equation (1),
silicagel-water binary system, equation (2),
lumped-parameter treatment for the reactors, evaporator and condenser,
specifications as delineated in Table 4.

The performance prediction of the proposed multi-bed regenerative strategy is based on an extension of the verified design code for the commercial two-bed chiller [15–16]. The structure of the original formalism is essentially unchanged, except that the energy balances for the condenser and evaporator have to be augmented to account for interaction with more than one bed. Heat and mass balance equations must similarly be augmented; they must also handle the additional bed transients. The rate of adsorption or desorption is governed by the linear driving force kinetic equation:

$$\frac{dq}{d\tau} = \frac{15 t_{cycle} D_{so} \exp[-E_a/(RT)]}{R_p^2} [q^*(P, T) - q] \quad (1)$$

The coefficients of which were determined by Chihara and Suzuki [17] and $q^*$ is given by the following empirical isotherm equation [18] which is based on the manufacturer's proprietary data [19]:

$$q^* = A(T_{sg}) \left[ \frac{P_{sat}(T_{ref})}{P_{sat}(T_{sg})} \right]^{B(T_{sg})} \quad (2)$$

The energy balance for bed I, ignoring heat losses, during its interaction with the evaporator can be written as $$(1 + \alpha_{Hex}) \frac{d\overline{T}_{bed,I}}{d\tau} + q_{bed,I} \frac{d\overline{h}_{ads}}{d\tau} = \quad (3a)$$

$$\frac{dq_{bed,I}}{d\tau} \{ \delta_I [\overline{h}_g(T_{evap}) - \overline{h}_{ads}(P_{evap}, T_{bed,I})] - (1 - \delta_I)\overline{\Delta H}_{ads} \} -$$

$$NTU_{cooling} \omega c_{c,i} \sum_{i=1}^{N} (\overline{T}_{bed,I} - \overline{T}_i).$$

The energy balance for the coolant can be expressed as $$\alpha_{bed\_tube,i} \frac{d\overline{T}_i}{d\tau} = \omega[\overline{h}_f(T_{i-1}) - \overline{h}_f(T_i) + NTU_{cooling}c_{c,i}(\overline{T}_{bed,I} - \overline{T}_i)] \quad (3b)$$

for $i = 1$ to $N$. $\overline{T}_i(0) = \overline{T}_{bedi}(0) = 0$. $\overline{T}_i(\tau) = \overline{T}_{N_2}(\tau)|_{cond}$ when bed I is being cooled directly by the coolant from the condenser, and $\overline{T}_1(\tau) = \overline{T}_N(\tau)|_{bed, I-1}$ when it is being cooled by the coolant from bed I-1. $q_{bed,I}(0) = q^*(P_{evap}(0), T_{bed,I}(0))$. It has been assumed that the relation $\overline{h}_{ads}(P, T) = \overline{h}_g(P, T) - \overline{\Delta H}_{ads}$ holds at all time, so that the transient isosteric heat of adsorption is insensitive to the instantaneous adsorbate concentration. The isosteric heat of adsorption has been obtained from the work of Sakoda and Suzuki [20].

When the bed J is interacting with the condenser, its energy balance can be written as $$(1 + \alpha_{Hex}) \frac{d\overline{T}_{bed,J}}{d\tau} + q_{bed,I} \frac{d\overline{h}_{ads}}{d\tau} = \quad (4a)$$

$$\theta_J \frac{dq_{bed,J}}{d\tau} \overline{\Delta H}_{ads} - NTU_{heating} \omega \overline{m}_{heating} c_{h,i} \sum_{i=1}^{N} (\overline{T}_{bed,J} - \overline{T}_i).$$

The energy balance for the coolant can be expressed as $$\alpha_{bed\_tube,i} \frac{d\overline{T}_i}{d\tau} = \quad (4b)$$

$$\omega \overline{m}_{heating} [\overline{h}_f(T_{i-1}) - \overline{h}_f(T_i) + NTU_{heating}c_{c,i}(\overline{T}_{bed,J} - \overline{T}_i)]$$

for i=1 to N. $\overline{T}_i(0) = \overline{T}_{bed,J}(0) = 1$. $\overline{T}_1(\tau) =$ when bed J is being heated directly by the waste heat source, and $\overline{T}_1(\tau) = \overline{T}_N(\tau)|_{bed,J-1}$ when it is being regenerated by the heating stream from bed J-1. $q_{bed,J}(0) = q^*(P_{cond}(0), T_{bed,J}(0))$. The condenser has been assumed, relative to the beds and evaporator, to be retaining negligible amount of refrigeration. However, since the condenser heat exchanging tube has been designed to be corrugated by the manufacturer, the enhanced surfaces will inevitably retain a thin film of condensate on the surface. This will ensure that the condenser is always maintained at the refrigerant saturated vapour pressure. Consequently, if $dq_{bed,J}/d\tau > 0$, $\theta_J = 0$.

During bed switching, the bed pressure changes in tandem with the bed temperature. Hence, in the current formalism, such operation has been assumed to be isosteric (i.e. $dq/d\tau = 0$). This phase of operation could still be described by the above equations, and the pressure prescribed by the isotherm equation.

The evaporator is, in general, interacting with N/2 beds at any time, its energy balance can be expressed as $$(\alpha_{ref} + \alpha_{evap}) \frac{d\overline{T}_{evap}}{d\tau} + \overline{h}_f(T_{evap}) \frac{dq_{ref}}{d\tau} = \quad (5a)$$

$$-\overline{h}_f(T_{cond}) \sum_{J=1}^{n/2} \theta_J \frac{dq_{bed,J}}{d\tau} - NTU_{chilled} \omega \overline{m}_{chilled} \sum_{i=1}^{N_1} (\overline{T}_{evap} - \overline{T}_i) -$$

$$\sum_{I=1}^{n/2} [\delta_I \overline{h}_g(T_{evap}) + (1 - \delta_I)\overline{h}_g(P_{evap}, T_{bed,I})] \frac{dq_{bed,I}}{d\tau}$$

The rate of change of liquid refrigerant mass is given by $$\frac{dq_{ref}}{d\tau} = -\sum_{k=1}^{n} \theta_k \frac{dq_{bed,k}}{d\tau}. \quad (5b)$$

If bed k is interacting with the evaporator, $\theta_k = 1$, and if it is interacting with the condenser, $\theta_k = 1$ when $dq_{bed,k}/dt < 0$ and $\theta_k = 0$ when $dq_{bed,k}/dt > 0$.

The energy balance for the chilled water can be expressed as $$\alpha_{evap\_tube,i} \frac{d\overline{T}_i}{d\tau} = \quad (5c)$$

$$\omega \overline{m}_{chilled} [\overline{h}_f(T_{i-1}) - \overline{h}_f(T_i) + NTU_{chilled}c_{chilled,i}(\overline{T}_{evap} - \overline{T}_i)]$$

for $i = 1$ to $N_1$. $\overline{T}_i(0) = \overline{T}_{evap}(0) = \overline{T}_1(\tau) = \frac{T_{chilled,i} - T_{c,i}}{T_{h,i} - T_{c,i}}$, and $q_{ref}(0) = q_{ref}^{ini}$.

Finally, the energy balance for the condenser which is interacting with N/2 beds in general and that of its coolant can be respectively expressed as $$\alpha_{cond} \frac{d\overline{T}_{cond}}{d\tau} = -\sum_{J=1}^{n/2} \theta_J [\overline{h}_g(P_{cond}, T_{bed,J}) - \overline{h}_f(T_{cond})] \frac{dq_{bed,J}}{d\tau} - \quad (6a)$$

$$NTU_{cond} \omega \overline{m}_{cond} \sum_{i=1}^{N_2} (\overline{T}_{cond} - \overline{T}_1), \text{ and}$$

$$\alpha_{cond\_tube,i} \frac{d\overline{T}_i}{d\tau} = \quad (6b)$$

$$\omega \overline{m}_{cond} [\overline{h}_f(T_{i-1}) - \overline{h}_f(T_i) + NTU_{cond}c_{c,i}(\overline{T}_{cond} - \overline{T}_i)]$$

for $i = 1$ to $N_2$. $\overline{T}_i(0) = \overline{T}_{cond}(0) = \overline{T}_1(\tau) = 0$.

It is intuitively clear that, during the dynamic-steady-state operation of an N-bed chiller, where all the beds are operating symmetrically, the optimal phase difference between the beds would be $2\omega/N$ and that N has to be an even number. This would ensure that the condenser and evaporator have minimum temperature fluctuation.

The above mentioned set of coupled equations is solved by the Adams-Moulton method found in the DIVPAG subroutine of the IMSL Fortran library subroutines. The tolerance has been set to 1E-8. Once the initial conditions are prescribed, the chiller is allowed to operate from transient to dynamic steady state. On a Pentium 233 MHz, 64 MB personal computer, it takes about 110 min to calculate a six-bed chiller operation.

The non-dimensional cycle averaged cooling power is defined as $$\overline{Q}_{evap} = \omega \overline{\dot{m}}_{chilled} c_{chilled,i} \int_0^1 (T_{chilled,i} - T_{chilled,o}) d\tau \qquad (7)$$

As mentioned earlier, since the invention focuses on the utilization of waste heat before it is ultimately purged to the environment, its enthalpy relative to that of the environment can be viewed as being a fixed energy input to a system. Consequently, maximising cooling capacity rather than the conventional coefficient of performance may be more pertinent. Thus, the following conversion efficiency is accordingly defined:

$$\eta = \frac{\overline{\dot{m}}_{chilled} c_{chilled,i}}{\overline{\dot{m}}_{heating} c_{h,i}} \int_0^1 (T_{chilled,i} - T_{chilled,o}) d\tau. \qquad (8)$$

The environment temperature has been selected to be $T_{c,i}$.

Performance Comparison of Two-, Four-, and Six-Bed Chillers

In order to effect a fair evaluation, the performances of the four- and six-bed chillers operating at an optimal phase difference are compared against the result of a commercial two-bed chiller.

The parameters of the commercial two-bed chiller and those of the multi-bed chillers are collated in table 4. It is emphasised that the total mass of adsorbent, refrigerant inventory and heat exchanging material have been held fixed. In this description, there are presented various cases when the adsorbers are cooled by the rated flow rate as delineated in Table 4. This will ensure that heat exchange is undertaken in the transition flow region, so that pumping power is kept to a minimum. One could always pipe all the coolant into the adsorbers. The improved heat exchange will be at the expense of pumping power.

This comparison is meant solely as an example to demonstrate the virtues of the present invention. In no way should the specific numbers provided for the various parameters be construed as restrictive on the present invention.

TABLE 4

Comparison of two-bed and multi-bed chillers specifications

| Parameters | 2-bed | 4-bed | 6-bed Series cooling | 6-bed Parallel cooling |
|---|---|---|---|---|
| Total coolant flowrate (kg/s) | 2.89 | | 1.37 | |
| Total adsorber coolant flowrate (kg/s) | 1.52 (fresh stream from cooling tower) | 0.760 (piped from condenser) | 0.507 (piped from condenser) | 1.01 (piped from condenser) |
| $\dot{m}_{heating}$ | 1.28 | 0.64 | 0.427 | |
| $\dot{m}_{chilled}$ | | 0.71 | | |
| $\dot{m}_{cond}$ | | 1.37 | | |
| $U_{cooling}$ | | 1602.56 | | |
| $U_{heating}$ | | 1724.14 | | |
| $U_{chilled}$ | | 2557.54 | | |
| $U_{cond}$ | | 4115.23 | | |
| $A_{bed}$ | 2.46 | 1.23 | 0.820 | |
| $A_{evap}$ | | 1.91 | | |
| $A_{cond}$ | | 3.73 | | |
| $M_{sg}$ | 47.0 | 23.5 | 15.7 | |
| $c_{p,Hex} M_{Hex}$ | 77719.4 × 10³ | 38859.7 × 10³ | 25906.5 × 10³ | |
| $c_{p,evap} M_{evap}$ | | 4805.7 × 10³ | | |
| $c_{p,cond} M_{cond}$ | | 9372.08 × 10³ | | |
| $V_{bed}$ | 1.778 × 10⁻² | 8.89 × 10⁻³ | 5.93 × 10⁻³ | |
| $V_{evap}$ | | 6.916 × 10⁻³ | | |
| $V_{cond}$ | | 1.349 × 10⁻² | | |

The cost of construction necessarily goes up with the number of beds. But depending on the prevailing economic conditions, the performance improvement of a multi-bed chiller over a two-bed chiller could outweigh the increase in capital investment. Structure wise, there should not be a drastic increase in cost. The expensive leak-proof outer shell of the two-bed chiller need not be changed significantly. One only needs to weld partitions and, of course, additional insulated piping in each of the two beds to create a multi-bed system. The four large-bore-size, vacuum-rated solenoid on-off valves of a two-bed system are replaced, in general, by 2N similar but smaller valves for an N-bed system. It is imperative to mention that, just as in a two-bed chiller, these on-off valves and the associated piping have to be designed such that the pressure drop between the bed and the evaporator/condenser is minimised. In general, each additional bed requires five normal duty solenoid gate valves for flow control.

Figure 2:
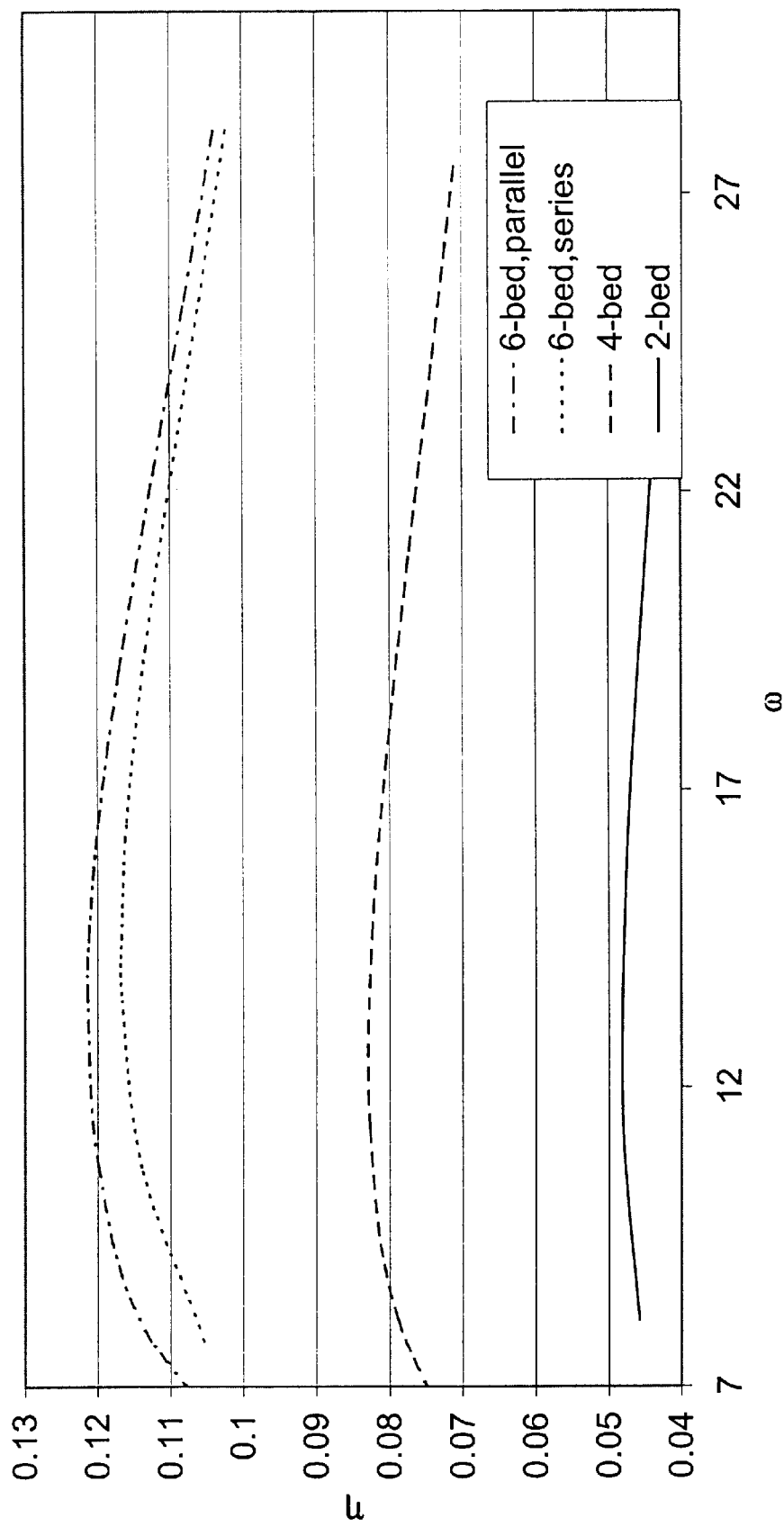
FIG. 2 illustrates the relation of recovery efficiency, $\eta$, as a function of dimensionless cycle time, $\omega$ for two-, four-, and six-bed adsorption chillers.

FIG. 2 shows the recovery efficiency, ρ of the various multi-bed schemes as a function of dimensionless cycle time, ω. The recovery efficiency of a two-bed chiller at a standard rated ω of 14.55 (corresponding to a cycle time of 450s) is 0.0478. It can be appreciated that, from two to four beds, the recovery efficiency is boosted by about 70%, whereas from four to six beds, the recovery efficiency is increased by another 40%. The six-bed-parallel configuration can be observed to be marginally better than its series counterpart, but one has to pay the price for added complexities. Specifically, flow metering has to be done carefully during design and commissioning so that there is sufficient flow from the condenser to the two beds in series and the one bed in parallel. One could anticipate that the recovery efficiency improves with the number of beds, but this has to be balanced with the cost of construction. It is worth mentioning that all these schemes have been operated at optimal switching time, $\omega_{sw}$ for maximum peak chilled water outlet temperature suppression. Since the speed of operation reduces with the number of beds, the optimal switching time tends to increase correspondingly. $\omega_{sw}$ for the two-bed, four-bed, six-bed parallel, and six-bed series are 1.13, 1.29, 1.46, and 1.78 respectively.

Figure 3:
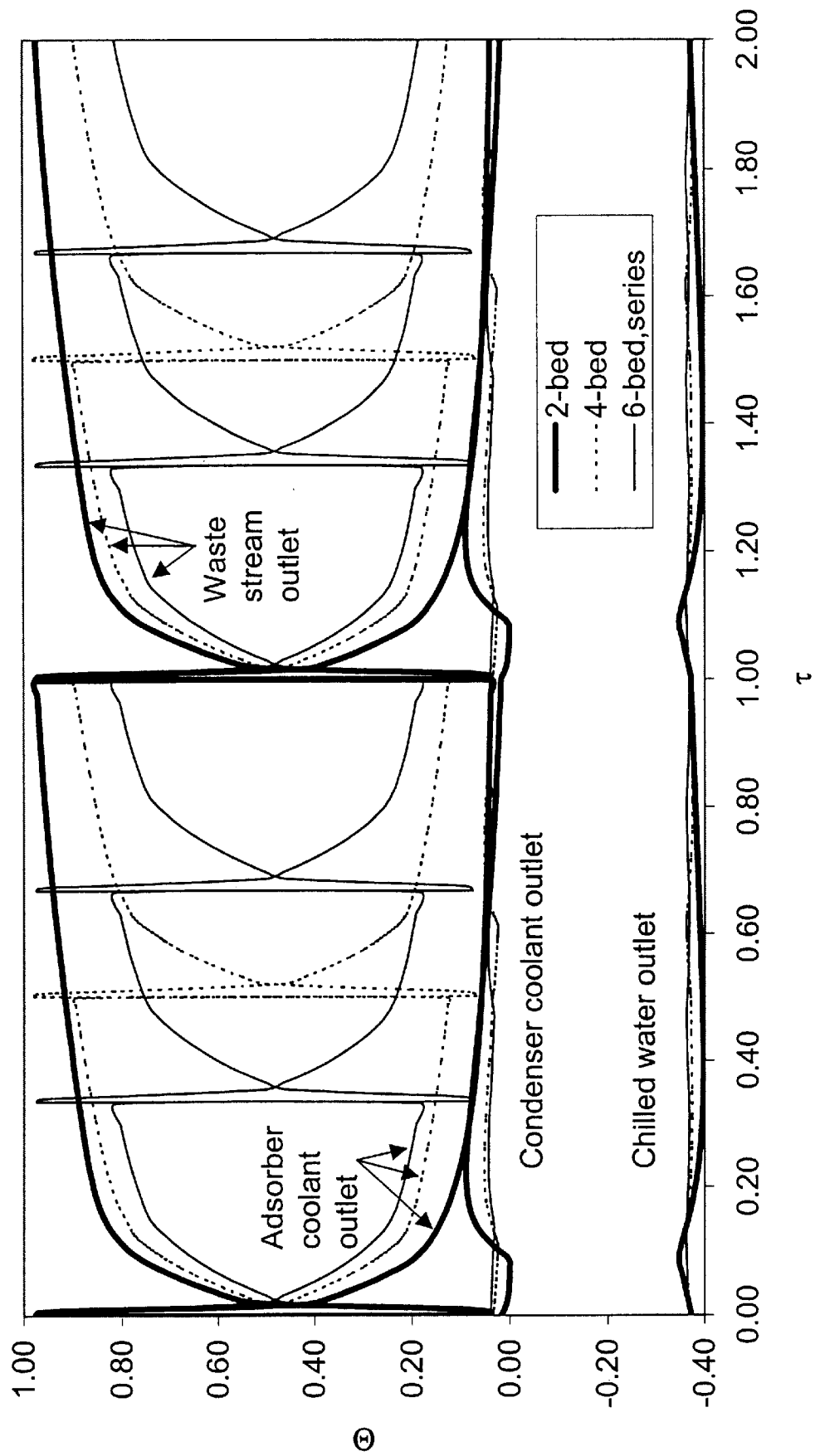
FIG. 3 illustrates the dimensionless outlet temperature, $\overline{T}$ profiles for the chilled water, condenser coolant, adsorber coolant, and waste heat stream for two-, four-, and six-bed adsorption chillers under dynamic-steady-state condition. Due to the choice of non-dimensionalising the temperature, the chilled water outlet dimensionless temperature turns out to be negative, a direct reflection that the system is operating as a chiller.

FIG. 3 illustrates the dimensionless outlet temperatures for the coolants, waste heat stream and chilled water during dynamic steady state. The trend for the 6-bed-parallel configuration has been omitted for clarity. One observes that the waste heat outlet temperature generally decreases with the number of beds, representing a better utilization of the waste heat before it is purged. The condenser coolant peak temperature for the two-bed is significantly slashed, rendering it suitable for subsequent cooling of the adsorbers. In the case of multi-bed chillers, chilled water outlet temperature tends to be smoothened. This may lead to the elimination of downstream cooling devices for demanding process cooling and dehumidification. With the same amount of resource commitment, chilled water outlet temperature and cycle average cooling capacity necessarily drop but at a rate slower than the reduction in heat source and coolant flowrate, resulting in an improved recovery efficiency. In fact heat rejection and input at the various components drop with an increase in the number of beds. Coupled with the fact that there is a better match in temperature between the bed and the coolant/waste heat stream and that the rate of change of temperature in the beds are slower, the entire chiller is working more reversibly. This result in a mitigation of the various irreversibilities identified and quantified in previous references [16].

The proposed multi-bed configuration also advantageously reduces the risk of ice formation in the evaporation upon the initial pull-down. It is customary to purge the beds of any non-condensibles before the inception. In a two-bed chiller, this leads to a vigorous boiling in the evaporator and a sudden temperature depression, increasing the risk of ice formation. Whereas in a multi-bed scheme, the N/2 adsorbers and desorbers start one at a time. Such a soft-start ensures that the evaporator approaches the targeted temperature in a gradual manner. This further implies that the total refrigerant inventory in the system can be reduced.

The present invention advantageously makes it possible to improve the recovery efficiency of low grade waste heat via a multi-bed regenerative scheme. This ensures that the enthalpy of waste stream relative to the environment is better utilized before being purged eventually. The same scheme can also suppress the chilled water outlet temperature fluctuation. This suggests that downstream temperature smoothening device may be downsized or eliminated for those applications involving demanding process cooling or dehumidification. It is also advantageously able to reduce the oscillation in the condenser coolant outlet temperature, making it possible to pipe the condenser coolant to further cool the adsorbers before finally returning to the cooling tower. For the same cooling capacity, the waste heat and coolant flowrates are reduced, resulting in an economy of piping material. By a better match between beds and streams temperatures, it has also advantageously been possible to mitigate the heat transfer bottleneck identified and quantified in previous references [16]. The reduction in the speed of chiller also reduces the rate of entropy generation.

It has further been quantified that, compared with a two-bed scheme, a four-bed scheme improves the recovery efficiency by about 70%. Whereas from a four- to a six-bed scheme, the margin of improvement is about 40%. With a reduction in chiller's speed, optimal switching time also tends to increase with the number of beds so as to achieve maximum peak chilled water temperature suppression. Finally, a multi-bed scheme makes it possible to start the beds one at a time. This prevents a sudden temperature drop in the evaporator, reducing the risk of ice formation.

TABLE 5

Cyclic-steady-state dimensionless outlet temperature profiles for two-, four-, and six-bed chillers

| | | | | | | | | | | | | |
|---|---|---|---|---|---|---|---|---|---|---|---|---|
| 0 | 6 | 62 | 2700 | 6 | 85.0742 | 80.61085 | 34.91316 | 10.63948 | 33.02395 | 38.02287 | 80.61085 | 0.125414 | 0.896936 | -0.370662 | 0.034854 |
| 0.002222 | 7 | 1 | 2701 | 6.002222 | 85.10871 | 80.63467 | 34.95692 | 10.64399 | 33.00034 | 38.10871 | 34.95692 | 0.978419 | 0.069872 | -0.37058 | 0.034426 |
| 0.004444 | 7 | 2 | 2702 | 6.004444 | 85.12186 | 80.65738 | 35.01326 | 10.65137 | 32.97133 | 37.98815 | 35.01326 | 0.978657 | 0.070892 | -0.370446 | 0.033901 |
| 0.006667 | 7 | 3 | 2703 | 6.006667 | 84.91622 | 80.68008 | 35.12224 | 10.66104 | 32.9433 | 37.96302 | 35.12224 | 0.974931 | 0.072867 | -0.370271 | 0.033393 |
| 0.008889 | 7 | 4 | 2704 | 6.008889 | 82.7542 | 80.71429 | 35.68107 | 10.67252 | 32.91687 | 37.86722 | 35.68107 | 0.935764 | 0.08299 | -0.370063 | 0.032914 |
| 0.01111 | 7 | 5 | 2705 | 6.01111 | 76.27895 | 80.798 | 38.09131 | 10.68539 | 32.8923 | 37.60416 | 38.09131 | 0.818459 | 0.126654 | -0.36983 | 0.032469 |
| 0.022222 | 7 | 6 | 2710 | 6.022222 | 56.84923 | 81.39016 | 58.54128 | 10.75873 | 32.79927 | 36.73256 | 58.54128 | 0.466472 | 0.497125 | -0.368501 | 0.030784 |
| 0.033333 | 7 | 7 | 2715 | 6.033333 | 54.2324 | 81.5192 | 61.4383 | 10.82832 | 32.73744 | 36.57665 | 61.4383 | 0.419065 | 0.549607 | -0.367242 | 0.029664 |
| 0.044444 | 7 | 8 | 2720 | 6.044444 | 52.23825 | 81.63665 | 63.60561 | 10.88829 | 32.68497 | 36.46012 | 63.60561 | 0.382939 | 0.58887 | -0.366154 | 0.028713 |
| 0.055556 | 7 | 9 | 2725 | 6.055556 | 50.47681 | 81.75319 | 65.51993 | 10.94148 | 32.63601 | 36.36281 | 65.51993 | 0.351029 | 0.623549 | -0.365191 | 0.027826 |
| 0.066667 | 7 | 10 | 2730 | 6.066667 | 48.90493 | 81.86878 | 67.24673 | 10.98993 | 32.58932 | 36.27588 | 67.24673 | 0.322553 | 0.654832 | -0.364313 | 0.02698 |
| 0.077778 | 7 | 11 | 2735 | 6.077778 | 47.49868 | 81.9832 | 68.80579 | 11.03505 | 32.54444 | 36.1955 | 68.80579 | 0.297077 | 0.683076 | -0.363495 | 0.026167 |
| 0.088889 | 7 | 12 | 2740 | 6.088889 | 46.23895 | 82.09624 | 70.21434 | 11.07771 | 32.5011 | 36.11956 | 70.21434 | 0.274256 | 0.708593 | -0.362723 | 0.025382 |
| 0.093333 | 7 | 13 | 2742 | 6.093333 | 45.74963 | 82.14103 | 70.73914 | 11.1032 | 32.48415 | 36.09043 | 70.73914 | 0.265392 | 0.7181 | -0.362261 | 0.025075 |
| 0.097778 | 7 | 14 | 2744 | 6.097778 | 45.26072 | 82.18557 | 71.24326 | 11.13486 | 32.4674 | 36.06293 | 71.24326 | 0.256535 | 0.727233 | -0.361687 | 0.024772 |
| 0.102222 | 7 | 15 | 2746 | 6.102222 | 44.80102 | 82.22985 | 71.72758 | 11.16192 | 32.45085 | 36.03694 | 71.72758 | 0.248207 | 0.736007 | -0.361197 | 0.024472 |
| 0.106667 | 7 | 16 | 2748 | 6.106667 | 44.39201 | 82.27385 | 72.19292 | 11.17914 | 32.43448 | 36.01142 | 72.19292 | 0.240797 | 0.744437 | -0.360885 | 0.024175 |
| 0.11111 | 7 | 17 | 2750 | 6.11111 | 44.03634 | 82.31764 | 72.63973 | 11.18448 | 32.42172 | 35.98506 | 72.63973 | 0.234354 | 0.752531 | -0.360788 | 0.023944 |
| 0.115556 | 7 | 18 | 2752 | 6.115556 | 43.72504 | 82.36585 | 73.05415 | 11.17843 | 32.46803 | 35.95699 | 73.05415 | 0.228715 | 0.760039 | -0.360898 | 0.024783 |
| 0.12 | 7 | 19 | 2754 | 6.12 | 43.4491 | 82.42748 | 73.41611 | 11.16306 | 32.56832 | 35.92747 | 73.41611 | 0.223716 | 0.766596 | -0.361176 | 0.0266 |
| 0.124444 | 7 | 20 | 2756 | 6.124444 | 43.20138 | 82.50546 | 73.7208 | 11.14073 | 32.69564 | 35.90635 | 73.7208 | 0.219228 | 0.772116 | -0.361581 | 0.028907 |
| 0.128889 | 7 | 21 | 2758 | 6.128889 | 42.97646 | 82.59728 | 73.97658 | 11.1135 | 32.83169 | 35.9141 | 73.97658 | 0.215153 | 0.77675 | -0.362074 | 0.031371 |
| 0.133333 | 7 | 22 | 2760 | 6.133333 | 42.77189 | 82.69706 | 74.19966 | 11.08299 | 32.96486 | 35.94124 | 74.19966 | 0.211447 | 0.780791 | -0.362627 | 0.033784 |
| 0.177778 | 7 | 23 | 2780 | 6.177778 | 41.67746 | 83.54111 | 75.84822 | 10.76971 | 33.77629 | 36.26883 | 75.84822 | 0.191621 | 0.810656 | -0.368302 | 0.048483 |
| 0.222222 | 7 | 24 | 2800 | 6.222222 | 40.97296 | 84.01023 | 76.89669 | 10.58274 | 33.9834 | 36.23703 | 76.89669 | 0.178858 | 0.82965 | -0.371689 | 0.052272 |
| 0.266667 | 7 | 25 | 2820 | 6.266667 | 40.3516 | 84.29919 | 77.66962 | 10.50025 | 33.94428 | 36.05828 | 77.66962 | 0.167601 | 0.843653 | -0.373184 | 0.051527 |
| 0.311111 | 7 | 26 | 2840 | 6.311111 | 39.79843 | 84.50554 | 78.32023 | 10.47795 | 33.8029 | 35.83459 | 78.32023 | 0.15758 | 0.855439 | -0.373588 | 0.048966 |
| 0.355556 | 7 | 27 | 2860 | 6.355556 | 39.3061 | 84.67041 | 78.91069 | 10.49031 | 33.62437 | 35.60375 | 78.91069 | 0.148661 | 0.866136 | -0.373364 | 0.045731 |
| 0.4 | 7 | 28 | 2880 | 6.4 | 38.86565 | 84.81153 | 79.46536 | 10.52337 | 33.43536 | 35.37899 | 79.46536 | 0.140682 | 0.876184 | -0.372765 | 0.042307 |
| 0.444444 | 7 | 29 | 2900 | 6.444444 | 38.46852 | 84.93683 | 79.99309 | 10.5691 | 33.24735 | 35.16446 | 79.99309 | 0.133488 | 0.885744 | -0.371937 | 0.038901 |
| 0.488889 | 7 | 30 | 2920 | 6.488889 | 38.10737 | 85.05023 | 80.49646 | 10.62262 | 33.06543 | 34.96099 | 80.49646 | 0.126945 | 0.894863 | -0.370967 | 0.035606 |
| 0.5 | 7 | 31 | 2925 | 6.5 | 38.02201 | 85.07699 | 80.61854 | 10.63683 | 33.02123 | 34.91185 | 80.61854 | 0.125399 | 0.897075 | -0.37071 | 0.034805 |
| 0.502222 | 7 | 32 | 2926 | 6.502222 | 38.00502 | 85.11141 | 80.64234 | 10.64134 | 32.99766 | 34.95565 | 34.95565 | 0.978468 | 0.069849 | -0.370628 | 0.034378 |
| 0.504444 | 7 | 33 | 2927 | 6.504444 | 37.98729 | 85.12446 | 80.66503 | 10.64873 | 32.9687 | 35.01203 | 35.01203 | 0.978704 | 0.07087 | -0.370494 | 0.033853 |
| 0.506667 | 7 | 34 | 2928 | 6.506667 | 37.96216 | 84.9187 | 80.68772 | 10.65841 | 32.94072 | 35.12105 | 35.12105 | 0.974976 | 0.072845 | -0.370319 | 0.033346 |
| 0.508889 | 7 | 35 | 2929 | 6.508889 | 37.8663 | 82.75652 | 80.72189 | 10.66991 | 32.91433 | 35.68002 | 35.68002 | 0.935807 | 0.082971 | -0.37011 | 0.032868 |
| 0.511111 | 7 | 36 | 2930 | 6.511111 | 37.60306 | 76.28105 | 80.80544 | 10.68279 | 32.8898 | 38.0908 | 35.68002 | 0.818497 | 0.126645 | -0.369877 | 0.032424 |
| 0.522222 | 7 | 37 | 2935 | 6.522222 | 36.73099 | 56.85063 | 81.39644 | 10.75622 | 32.7969 | 58.54516 | 58.54516 | 0.466497 | 0.497195 | -0.368547 | 0.030741 |
| 0.533333 | 7 | 38 | 2940 | 6.533333 | 36.57514 | 54.23315 | 81.52537 | 10.82579 | 32.73513 | 61.44215 | 61.44215 | 0.419079 | 0.549677 | -0.367286 | 0.029622 |
| 0.544444 | 7 | 39 | 2945 | 6.544444 | 36.45864 | 52.23877 | 81.64274 | 10.88594 | 32.68271 | 52.23877 | 63.60961 | 0.382949 | 0.588942 | -0.366197 | 0.028672 |
| 0.555556 | 7 | 40 | 2950 | 6.555556 | 36.36135 | 50.47712 | 81.75918 | 10.93919 | 32.63919 | 50.47712 | 65.52416 | 0.351035 | 0.623626 | -0.365232 | 0.027786 |
| 0.566667 | 7 | 41 | 2955 | 6.566667 | 36.27444 | 48.90502 | 81.874469 | 10.98772 | 32.58715 | 48.90502 | 67.25115 | 0.322555 | 0.654912 | -0.364353 | 0.026941 |
| 0.577778 | 7 | 42 | 2960 | 6.577778 | 36.19409 | 47.4986 | 81.98902 | 11.0329 | 32.54232 | 47.4986 | 68.81035 | 0.297076 | 0.683159 | -0.363534 | 0.026129 |
| 0.588889 | 7 | 43 | 2965 | 6.588889 | 36.11818 | 46.23873 | 82.10196 | 11.07562 | 32.49902 | 46.23873 | 70.21903 | 0.274252 | 0.708678 | -0.362761 | 0.025345 |
| 0.593333 | 7 | 44 | 2967 | 6.593333 | 36.08906 | 45.74941 | 82.14672 | 11.1011 | 32.48208 | 45.74941 | 70.74387 | 0.265388 | 0.718186 | -0.362299 | 0.025038 |
| 0.597778 | 7 | 45 | 2969 | 6.597778 | 36.06158 | 45.26056 | 82.19122 | 11.13275 | 32.46535 | 45.26056 | 71.24803 | 0.256532 | 0.727319 | -0.361726 | 0.024735 |
| 0.602222 | 7 | 46 | 2971 | 6.602222 | 36.03559 | 44.80095 | 82.23545 | 11.15978 | 32.44882 | 44.80095 | 71.73238 | 0.248206 | 0.736094 | -0.361236 | 0.024435 |
| 0.606667 | 7 | 47 | 2973 | 6.606667 | 36.01006 | 44.39201 | 82.27942 | 11.17698 | 32.43247 | 44.39201 | 72.19776 | 0.240797 | 0.744525 | -0.360924 | 0.024139 |
| 0.611111 | 7 | 48 | 2975 | 6.611111 | 35.98371 | 44.03639 | 82.32318 | 11.1823 | 32.41971 | 44.03639 | 72.64459 | 0.234355 | 0.752619 | -0.360828 | 0.023908 |

TABLE 5-continued

Cyclic-steady-state dimensionless outlet temperature profiles for two-, four-, and six-bed chillers

| | | | | | | | | | | | |
|---|---|---|---|---|---|---|---|---|---|---|---|
| 0.615556 | 7 | 49 | 2977 | 6.615556 | 35.95564 | 82.37134 | 43.72512 | 32.46601 | 11.17624 | 73.05905 | 43.72512 | 0.228716 | 0.760128 | −0.360938 | 0.024747 |
| 0.62 | 7 | 50 | 2979 | 6.62 | 35.92612 | 82.43292 | 43.44919 | 32.56631 | 11.16087 | 73.42105 | 43.44919 | 0.223717 | 0.766686 | −0.361216 | 0.026563 |
| 0.624444 | 7 | 51 | 2981 | 6.624444 | 35.905 | 82.51085 | 43.20146 | 32.69363 | 11.13853 | 73.72578 | 43.20146 | 0.219229 | 0.772206 | −0.361621 | 0.02887 |
| 0.628889 | 7 | 52 | 2983 | 6.628889 | 35.91004 | 82.60262 | 42.97654 | 32.82969 | 11.11131 | 73.98159 | 42.97654 | 0.215155 | 0.77684 | −0.362114 | 0.031335 |
| 0.633333 | 7 | 53 | 2985 | 6.633333 | 35.93987 | 82.70235 | 42.77196 | 32.96288 | 11.08081 | 74.20469 | 42.77196 | 0.211448 | 0.780882 | −0.362666 | 0.033748 |
| 0.677778 | 7 | 54 | 3005 | 6.677778 | 36.26754 | 83.54593 | 41.6773 | 33.77446 | 10.76767 | 75.85331 | 41.6773 | 0.191618 | 0.810748 | −0.368339 | 0.04845 |
| 0.722222 | 7 | 55 | 3025 | 6.722222 | 36.23582 | 84.01459 | 40.97268 | 33.98364 | 10.58082 | 76.90175 | 40.97268 | 0.178853 | 0.829742 | −0.371724 | 0.05224 |
| 0.766667 | 7 | 56 | 3045 | 6.766667 | 36.05711 | 84.30311 | 40.35121 | 33.94258 | 10.49844 | 77.67459 | 40.35121 | 0.167594 | 0.843743 | −0.373217 | 0.051496 |
| 0.811111 | 7 | 57 | 3065 | 6.811111 | 35.83345 | 84.50904 | 39.798 | 33.80123 | 10.47625 | 78.3251 | 39.798 | 0.157573 | 0.855527 | −0.373619 | 0.048935 |
| 0.855556 | 7 | 58 | 3085 | 6.855556 | 35.60263 | 84.67353 | 39.30561 | 33.62275 | 10.48871 | 78.91543 | 39.30561 | 0.148652 | 0.866222 | −0.373393 | 0.045702 |
| 0.9 | 7 | 59 | 3105 | 6.9 | 35.37791 | 84.8143 | 38.86513 | 33.43379 | 10.52186 | 79.46996 | 38.86513 | 0.140673 | 0.876267 | −0.372792 | 0.042279 |
| 0.944444 | 7 | 60 | 3125 | 6.944444 | 35.1634 | 84.9393 | 38.46795 | 33.24582 | 10.56767 | 79.99753 | 38.46795 | 0.133477 | 0.885825 | −0.371963 | 0.038874 |
| 0.988889 | 7 | 61 | 3145 | 6.988889 | 34.95998 | 85.05242 | 38.10683 | 33.06397 | 10.62126 | 80.50072 | 38.10683 | 0.126935 | 0.894941 | −0.370992 | 0.035579 |
| 1 | 7 | 62 | 3150 | 7 | 34.91084 | 85.07912 | 38.02145 | 33.01978 | 10.63549 | 80.62276 | 38.02145 | 0.125389 | 0.897151 | −0.370734 | 0.034779 |
| 1.002222 | 8 | 1 | 3151 | 7.002222 | 34.95466 | 85.11347 | 85.11347 | 32.99624 | 10.64001 | 34.95466 | 85.11347 | 0.978505 | 0.069831 | −0.370652 | 0.034352 |
| 1.004444 | 8 | 2 | 3152 | 7.004444 | 35.01105 | 85.12644 | 85.12644 | 32.96731 | 10.6474 | 35.01105 | 85.12644 | 0.97874 | 0.070852 | −0.370518 | 0.033828 |
| 1.006667 | 8 | 3 | 3153 | 7.006667 | 35.12009 | 84.92059 | 84.92059 | 32.93936 | 10.65709 | 35.12009 | 84.92059 | 0.975011 | 0.072828 | −0.370343 | 0.033322 |
| 1.008889 | 8 | 4 | 3154 | 7.008889 | 35.67914 | 82.7583 | 82.7583 | 32.913 | 10.66859 | 35.67914 | 82.7583 | 0.935839 | 0.082955 | −0.370134 | 0.032844 |
| 1.011111 | 8 | 5 | 3155 | 7.011111 | 38.0902 | 76.28266 | 76.28266 | 32.8885 | 10.68148 | 38.0902 | 76.28266 | 0.818526 | 0.126634 | −0.369901 | 0.0324 |
| 1.022222 | 8 | 6 | 3160 | 7.022222 | 58.54696 | 76.73024 | 56.85174 | 32.79568 | 10.75495 | 34.95466 | 85.11347 | 0.466517 | 0.497228 | −0.36857 | 0.030719 |
| 1.033333 | 8 | 7 | 3165 | 7.033333 | 61.44387 | 54.23402 | 54.23402 | 32.73395 | 10.82455 | 58.54696 | 56.85174 | 0.419095 | 0.549708 | −0.367309 | 0.029601 |
| 1.044444 | 8 | 8 | 3170 | 7.044444 | 63.6114 | 52.23945 | 52.23945 | 32.68156 | 10.88474 | 61.44387 | 54.23402 | 0.382961 | 0.588975 | −0.366219 | 0.028651 |
| 1.055556 | 8 | 9 | 3175 | 7.055556 | 65.52608 | 50.47764 | 50.47764 | 32.63266 | 10.93802 | 63.6114 | 52.23945 | 0.351044 | 0.623661 | −0.365253 | 0.027766 |
| 1.066667 | 8 | 10 | 3180 | 7.066667 | 67.25319 | 48.90542 | 48.90542 | 32.58604 | 10.98658 | 65.52608 | 50.4776 | 0.322562 | 0.654949 | −0.364374 | 0.026921 |
| 1.077778 | 8 | 11 | 3185 | 7.077778 | 68.81249 | 47.49889 | 47.49889 | 32.54124 | 11.03179 | 67.25319 | 48.90542 | 0.297081 | 0.683197 | −0.363555 | 0.026109 |
| 1.088889 | 8 | 12 | 3190 | 7.088889 | 70.22125 | 46.2389 | 46.2389 | 32.49796 | 11.07453 | 68.81249 | 47.49889 | 0.274255 | 0.708718 | −0.36278 | 0.025325 |
| 1.093333 | 8 | 13 | 3192 | 7.093333 | 70.74611 | 45.74958 | 45.74958 | 32.4810 | 11.10002 | 70.22125 | 46.2389 | 0.265391 | 0.718227 | −0.362318 | 0.025019 |
| 1.097778 | 8 | 14 | 3194 | 7.097778 | 71.2503 | 45.26079 | 45.26079 | 32.46431 | 11.13164 | 70.74611 | 45.74958 | 0.256536 | 0.72736 | −0.361746 | 0.024716 |
| 1.102222 | 8 | 15 | 3196 | 7.102222 | 71.73467 | 44.80124 | 44.80124 | 32.44779 | 11.15865 | 71.2503 | 45.26079 | 0.248211 | 0.736135 | −0.361256 | 0.024416 |
| 1.106667 | 8 | 16 | 3198 | 7.106667 | 72.20007 | 44.39234 | 44.39234 | 32.43145 | 11.17583 | 71.73467 | 44.80124 | 0.240803 | 0.744566 | −0.360945 | 0.02412 |
| 1.111111 | 8 | 17 | 3200 | 7.111111 | 72.64692 | 44.03675 | 44.03675 | 32.41872 | 11.18112 | 72.20007 | 44.39234 | 0.234361 | 0.752662 | −0.360849 | 0.02389 |
| 1.115556 | 8 | 18 | 3202 | 7.115556 | 73.06137 | 43.72549 | 43.72549 | 32.4651 | 11.17505 | 72.64692 | 44.03675 | 0.228723 | 0.76017 | −0.360959 | 0.02473 |
| 1.12 | 8 | 19 | 3204 | 7.12 | 73.42334 | 43.44956 | 43.44956 | 32.56545 | 11.15967 | 73.06137 | 43.72549 | 0.223724 | 0.766727 | −0.361238 | 0.026548 |
| 1.124444 | 8 | 20 | 3206 | 7.124444 | 73.72806 | 43.20183 | 43.20183 | 32.69279 | 11.13734 | 73.42334 | 43.44956 | 0.219236 | 0.772248 | −0.361642 | 0.028855 |
| 1.128889 | 8 | 21 | 3208 | 7.128889 | 73.98386 | 42.9769 | 42.9769 | 32.82887 | 11.11011 | 73.72806 | 43.20183 | 0.215161 | 0.776881 | −0.362136 | 0.03132 |
| 1.133333 | 8 | 22 | 3210 | 7.133333 | 74.20695 | 42.77232 | 42.77232 | 32.96207 | 11.07962 | 73.98386 | 42.9769 | 0.211455 | 0.780923 | −0.362688 | 0.033733 |
| 1.177778 | 8 | 23 | 3230 | 7.177778 | 75.85558 | 41.67756 | 41.67756 | 33.7737 | 10.76703 | 74.20695 | 42.77232 | 0.191623 | 0.810789 | −0.36836 | 0.048437 |
| 1.222222 | 8 | 24 | 3250 | 7.222222 | 76.90399 | 40.97283 | 40.97283 | 33.9829 | 10.57976 | 75.85558 | 41.67756 | 0.178856 | 0.829782 | −0.371743 | 0.052226 |
| 1.266667 | 8 | 25 | 3270 | 7.266667 | 77.67679 | 40.35131 | 40.35131 | 33.9418 | 10.49744 | 76.90399 | 40.97283 | 0.167596 | 0.843782 | −0.373235 | 0.051483 |
| 1.311111 | 8 | 26 | 3290 | 7.311111 | 78.32725 | 39.79801 | 39.79801 | 33.80052 | 10.47531 | 77.67679 | 40.35131 | 0.157573 | 0.855566 | −0.373636 | 0.048922 |
| 1.355556 | 8 | 27 | 3310 | 7.355556 | 78.91752 | 39.30557 | 39.30557 | 33.62205 | 10.48786 | 78.32725 | 39.79801 | 0.148652 | 0.866259 | −0.373409 | 0.045689 |
| 1.4 | 8 | 28 | 3330 | 7.4 | 79.47198 | 38.86508 | 38.86508 | 33.43311 | 10.52102 | 78.91752 | 39.30557 | 0.140672 | 0.876304 | −0.372808 | 0.042266 |
| 1.444444 | 8 | 29 | 3350 | 7.444444 | 79.99948 | 38.46789 | 38.46789 | 33.24516 | 10.56688 | 79.47198 | 38.86508 | 0.133476 | 0.88586 | −0.371977 | 0.038862 |
| 1.488889 | 8 | 30 | 3370 | 7.488889 | 80.5026 | 38.10673 | 38.10673 | 33.06334 | 10.62052 | 79.99948 | 38.46789 | 0.126934 | 0.894975 | −0.371005 | 0.035568 |
| 1.5 | 8 | 31 | 3375 | 7.5 | 80.62461 | 38.02136 | 38.02136 | 33.01915 | 10.63475 | 80.5026 | 38.10673 | 0.125387 | 0.897185 | −0.370747 | 0.034767 |
| 1.502222 | 8 | 32 | 3376 | 7.502222 | 80.64841 | 38.00437 | 38.00437 | 33.01452 | 10.63927 | 80.62461 | 38.02136 | 0.125387 | 0.897185 | − | |
| 1.504444 | 8 | 33 | 3377 | 7.504444 | 80.67109 | 37.98664 | 37.98664 | 32.99563 | 10.64427 | 80.64841 | 38.00437 | 0.978524 | 0.069824 | −0.370665 | 0.034341 |
| 1.506667 | 8 | 34 | 3378 | 7.506667 | 80.69377 | 37.96151 | 37.96151 | 32.96672 | 10.64667 | 80.67109 | 37.98664 | 0.978758 | 0.069845 | −0.370531 | 0.033817 |
| 1.508889 | 8 | 35 | 3379 | 7.508889 | 80.7279 | 37.86562 | 37.86562 | 32.93878 | 10.65636 | 80.69377 | 37.96151 | 0.975028 | 0.072821 | −0.370356 | 0.033311 |
| 1.511111 | 8 | 36 | 3380 | 7.511111 | 80.81128 | 37.6023 | 37.6023 | 32.91244 | 10.66786 | 80.7279 | 37.86562 | 0.935855 | 0.082949 | −0.370147 | 0.032834 |
| | | | | | | 37.6023 | 37.6023 | 32.88795 | 10.68076 | 80.81128 | 37.6023 | 0.818542 | 0.12663 | −0.369914 | 0.03239 |

TABLE 5-continued

Cyclic-steady-state dimensionless outlet temperature profiles for two-, four-, and six-bed chillers

| | | | | | | | | | | | | | |
|---|---|---|---|---|---|---|---|---|---|---|---|---|---|
| 1.522222 | 8 | 37 | 3385 | 7.522222 | 81.40097 | 58.5478 | 36.73005 | 56.85242 | 10.75424 | 32.79517 | 56.85242 | 58.5478 | 0.466529 | 0.497243 | -0.368583 | 0.03071 |
| 1.533333 | 8 | 38 | 3390 | 7.533333 | 81.52981 | 61.44464 | 36.57426 | 54.23456 | 10.82387 | 32.73346 | 54.23456 | 61.44464 | 0.419104 | 0.549722 | -0.367321 | 0.029592 |
| 1.544444 | 8 | 39 | 3395 | 7.544444 | 81.64712 | 63.61219 | 36.45778 | 52.23992 | 10.88407 | 32.68108 | 52.23992 | 63.61219 | 0.38297 | 0.588989 | -0.366231 | 0.028643 |
| 1.555556 | 8 | 40 | 3400 | 7.555556 | 81.7635 | 65.52693 | 36.3605 | 50.47804 | 10.93737 | 32.63219 | 50.47804 | 65.52693 | 0.351051 | 0.623676 | -0.365265 | 0.027757 |
| 1.566667 | 8 | 41 | 3405 | 7.566667 | 81.87894 | 67.25408 | 36.27362 | 48.90574 | 10.98594 | 32.58558 | 48.90574 | 67.25408 | 0.322568 | 0.654965 | -0.364385 | 0.026913 |
| 1.577778 | 8 | 42 | 3410 | 7.577778 | 81.99321 | 68.81341 | 36.19328 | 47.49917 | 11.03117 | 32.54078 | 47.49917 | 68.81341 | 0.297086 | 0.683214 | -0.363566 | 0.026101 |
| 1.588889 | 8 | 43 | 3415 | 7.588889 | 82.10608 | 70.2222 | 36.11739 | 46.23913 | 11.07393 | 32.49752 | 46.23913 | 70.2222 | 0.27426 | 0.708735 | -0.362791 | 0.025317 |
| 1.593333 | 8 | 44 | 3417 | 7.593333 | 82.15081 | 70.74707 | 36.08827 | 45.74981 | 11.09942 | 32.4806 | 45.74981 | 70.74707 | 0.265395 | 0.718244 | -0.362329 | 0.025011 |
| 1.597778 | 8 | 45 | 3419 | 7.597778 | 82.19528 | 71.25127 | 36.06079 | 45.26102 | 11.13103 | 32.46388 | 45.26102 | 71.25127 | 0.25654 | 0.727378 | -0.361757 | 0.024708 |
| 1.602222 | 8 | 46 | 3421 | 7.602222 | 82.23949 | 71.73565 | 36.0348 | 44.80149 | 11.15804 | 32.44736 | 44.80149 | 71.73565 | 0.248215 | 0.736153 | -0.361267 | 0.024409 |
| 1.606667 | 8 | 47 | 3423 | 7.606667 | 82.28343 | 72.20106 | 36.00927 | 44.39261 | 11.1752 | 32.43102 | 44.39261 | 72.20106 | 0.240808 | 0.744584 | -0.360956 | 0.024113 |
| 1.611111 | 8 | 48 | 3425 | 7.611111 | 82.32716 | 72.64792 | 35.98292 | 44.03704 | 11.1805 | 32.41829 | 44.03704 | 72.64792 | 0.234367 | 0.75268 | -0.360861 | 0.023882 |
| 1.615556 | 8 | 49 | 3427 | 7.615556 | 82.3753 | 73.06238 | 35.95484 | 43.72578 | 11.17442 | 32.46465 | 43.72578 | 73.06238 | 0.228728 | 0.760188 | -0.360971 | 0.024722 |
| 1.62 | 8 | 50 | 3429 | 7.62 | 82.43687 | 73.42437 | 35.92533 | 43.44985 | 11.15904 | 32.56498 | 43.44985 | 73.42437 | 0.223729 | 0.766746 | -0.361249 | 0.02654 |
| 1.624444 | 8 | 51 | 3431 | 7.624444 | 82.51478 | 73.72909 | 35.90421 | 43.20212 | 11.13671 | 32.69235 | 43.20212 | 73.72909 | 0.219241 | 0.772266 | -0.361654 | 0.028847 |
| 1.628889 | 8 | 52 | 3433 | 7.628889 | 82.60653 | 73.98489 | 35.90928 | 42.97718 | 11.10948 | 32.82843 | 42.97718 | 73.98489 | 0.215166 | 0.7769 | -0.362147 | 0.031312 |
| 1.633333 | 8 | 53 | 3435 | 7.633333 | 82.70623 | 74.208 | 35.93912 | 42.77258 | 11.07899 | 32.96163 | 42.77258 | 74.208 | 0.21146 | 0.780188 | -0.362699 | 0.033725 |
| 1.677778 | 8 | 54 | 3455 | 7.677778 | 83.54947 | 75.85666 | 36.26685 | 41.67774 | 10.76594 | 33.7733 | 41.67774 | 75.85666 | 0.191626 | 0.810809 | -0.368371 | 0.048429 |
| 1.722222 | 8 | 55 | 3475 | 7.722222 | 84.01778 | 76.90507 | 36.23516 | 40.97294 | 10.5792 | 33.98252 | 40.97294 | 76.90507 | 0.178858 | 0.829802 | -0.371754 | 0.05222 |
| 1.766667 | 8 | 56 | 3495 | 7.766667 | 84.30596 | 77.67786 | 36.05647 | 40.35138 | 10.49691 | 33.94148 | 40.35138 | 77.67786 | 0.167597 | 0.843802 | -0.373244 | 0.051476 |
| 1.811111 | 8 | 57 | 3515 | 7.811111 | 84.51158 | 78.32829 | 35.83283 | 39.79807 | 10.4748 | 33.80016 | 39.79807 | 78.32829 | 0.157574 | 0.855585 | -0.373645 | 0.048916 |
| 1.855556 | 8 | 58 | 3535 | 7.855556 | 84.6758 | 78.91854 | 35.60203 | 39.3056 | 10.48735 | 33.6217 | 39.3056 | 78.91854 | 0.148652 | 0.866278 | -0.373418 | 0.045683 |
| 1.9 | 8 | 59 | 3555 | 7.9 | 84.81631 | 79.47297 | 35.37732 | 38.86508 | 10.52057 | 33.43277 | 38.86508 | 79.47297 | 0.140672 | 0.876322 | -0.372816 | 0.04226 |
| 1.944444 | 8 | 60 | 3575 | 7.944444 | 84.94109 | 80.00044 | 35.16283 | 38.46789 | 10.56645 | 33.24483 | 38.46789 | 80.00044 | 0.133476 | 0.885878 | -0.371985 | 0.038856 |
| 1.988889 | 8 | 61 | 3595 | 7.988889 | 85.054 | 80.50352 | 34.95942 | 38.10671 | 10.62011 | 33.06302 | 38.10671 | 80.50352 | 0.126933 | 0.894991 | -0.371013 | 0.035562 |
| 2 | 8 | 62 | 3600 | 8 | 85.08066 | 80.62553 | 34.91029 | 38.02134 | 10.63435 | 33.01884 | 38.02134 | 80.62553 | 0.125387 | 0.897202 | -0.370755 | 0.034762 |

REFERENCES

[1] Y. Yonezawa, T. Ohnishi, S. Okumura, A. Sakai, H. Nakano, M. Matsushita, A. Morikawa, M. Yoshihara, "Method of operating adsorption refrigerator", U.S. Pat. No. 5,024,064, (1991).

[2] Y. Yonezawa, M. Matsushita, K. Oku, H. Nakano, S. Okumura, M. Yoshihara, A. Sakai, A. Morikawa, "Adsorption refrigeration system", U.S. Pat. No. 4,881,376, (1989).

[3] BB Saha, EC Boelman, and T Kashiwagi, "Computational analysis of an advanced adsorption-refrigeration cycle", Energy, vol. 20, no. 10, pp. 983–994, (1995).

[4] EC Boelman, BB Saha, and T Kashiwagi, "Experimental investigation of a silica gel-water adsorption refrigeration cycle—the influence of operating conditions on cooling output and COP", ASHRAE Trans: Research, vol. 101, part 2, pp. 358–366, (1995).

[5] H. Sato, S. Honda, S. Inoue, H. Tanaka, T. Terao, "adsorptive type refrigeration apparatus", U.S. Pat. No. 5,619,866, (1997).

[6] H. Sato, H. Tanaka, S. Honda, K. Fujiwara, S. Inoue, "Adsorptive type refrigeration apparatus", U.S. Pat. No. 5,775,126, (1998).

[7] D. I. Tchernev, "Heat pump energized by low-grade heat source", U.S. Pat. No. 5,729,988, (1998).

[8] L. D. Kirol, U. Rockenfeller, "Heat transfer apparatus and methods for solid-vapor sorption systems", U.S. Pat. No. 5,477,706, (1995).

[9] F. Meunier, "Refrigerating and heating apparatus using a solid sorbent", U.S. Pat. No. 5,477,705, (1995).

[10] J. A. Jones, "Heat cascading regenerative sorption heat pump", U.S. Pat. No. 5,463,879, (1995).

[11] S. V. Shelton, "Dual bed heat pump", U.S. Pat. No. 4,694,659, (1987).

[12] J. A. Jones, "Staged regenerative sorption heat pump opening method", U.S. Pat. No. 5,386,705, (1995).

[13] J. A. Jones, "Regenerative adsorbent heat pump system with working fluid and adsorbent", U.S. Pat. No. 5,347,815, (1994).

[14] J. A. Jones, "Heat pump system with sorbent bed compressors", U.S. Pat. No. 5,046,319, (1991).

[15] HT Chua, KC Ng, A Malek, T Kashiwagi, A Akisawa, and BB Saha, "Modeling the performance of two-bed, silica gel-water adsorption chillers", Accepted by Int. J. Refrig., (1998).

[16] HT Chua, KC Ng, A Malek, T Kashiwagi, A Akisawa, and BB Saha, "Entropy generation analysis of two-bed, silica gel-water, non-regenerative adsorption chillers", J. Phys. D: Appl. Phys., vol. 31, no. 12, pp. 1471–1477, (1998).

[17] K Chihara and M Suzuki, "Air drying by pressure swing adsorption", J. Chem. Eng. Japan, vol. 16, pp. 293–298, (1983).

[18] BB Saha, EC Boelman, and T Kashiwagi, "Computer simulation of a silica gel-water adsorption refrigeration cycle—the influence of operating conditions on cooling output and COP", ASHRAE Trans.: Res., vol. 101, pp. 348–357, (1995).

[19] NACC, PTX data for the silica gel/water pair, manufacturer's proprietary data, Nishiyodo Air Conditioning Co Ltd, Tokyo, (1992).

[20] A Sakoda and M Suzuki, "Fundamental study on solar powered adsorption cooling system", J. Chem. Eng. Japan, vol. 17, no. 1, pp. 52–57, (1984).

NOMENELATUCE

A coefficient appearing in the empirical isotherm correlation $A_{bed}$ bed heat transfer area (m$^2$)

$A_{evap}$ evaporator heat transfer area (m$^2$)

$A_{cond}$ condenser heat transfer area (m$^2$)

B index appearing in the empirical isotherm correlation $c_{p,evap}$ specific heat capacity of evaporator heat exchanging material (Jkg$^{-1}$K$^{-1}$)

$c_{p,cond}$ specific heat capacity of condenser heat exchanging material (Jkg$^{-1}$K$^{-1}$)

$c_{p,Hex}$ specific heat capacity of heat exchanger tube and fin (Jkg$^{-1}$H$^{-1}$)

$c_{p,ref}$ specific heat capacity of liquid refrigerant (Jkg$^{-1}$K$^{-1}$)

$c_{p,sg}$ specific heat capacity of dry adsorbent (Jkg$^{-1}$K$^{-1}$)

$c_{x,i}$ $$\frac{c_p(T_{x,i})}{c_{p,sg}}$$

q fraction of refrigerant adsorbed by the adsorbent (kg per kg of dry adsorbent)

q* fraction of refrigerant which can be adsorbed by the adsorbent under conditions of saturation (kg per kg of dry adsorbent)

$q_{bed,I}$ fraction of refrigerant adsorbed by the adsorbent in bed I (kg per kg of dry adsorbent)

$q_{ref}$ ratio of the mass of liquid refrigerant inventory in the evaporator to that of the dry adsorbent (kg per kg of dry adsorbent)

$q_{ref}^{ini}$ ratio of the initial mass of liquid refrigerant inventory in the evaporator to that of the dry adsorbent (kg per kg of dry adsorbent)

$q_{cond}$ ratio of the mass of condensed refrigerant in the condenser to that of the dry adsorbent (kg per kg of dry adsorbent)

$E_a$ activation energy of surface diffusion (Jmol$^{-1}$)

$D_{s0}$ pre-exponent constant in the kinetics equation (m$^2$s$^{-1}$)

$h_{ads}$ specific enthalpy of adsorbate (Jkg$^{-1}$)

$h_f$ saturated fluid specific enthalpy (Jkg$^{-1}$)

$\bar{h}$ $$\frac{h}{c_{p,sg}(T_{h,i} - T_{c,i})}$$

$\dot{m}_{chilled}$ chilled water flowrate (kgs$^{-1}$)
$\dot{m}_{cond}$ condenser coolant flowrate (kgs$^{-1}$)
$\dot{m}_{cooling}$ adsorber coolant flowrate (kgs$^{-1}$)
$\dot{m}_{heating}$ desorber waste heat source flowrate (kgs$^{-1}$)
$\overline{\dot{m}}$ $$\frac{\dot{m}}{\dot{m}_{cooling}}$$

$M_{cond}$ mass of condenser heat exchanger tube (kg)
$M_{evap}$ mass of evaporator heat exchanger tube (kg)
$M_{Hex}$ mass of heat exchanger tube and fin in the bed (kg)
$M_{sg}$ mass of silica gel mass in one bed (kg)
$n, N_1, N_2$ number of discrete elements in the heat exchanging tubes
$NTU_{cooling}$ $$\frac{U_{cooling} A_{bed}/N}{\dot{m}_{cooling} c_p(T_{c,i})}$$

$NTU_{chilled}$ $$\frac{U_{chilled} A_{evap}/N_1}{\dot{m}_{chilled} c_p(T_{chilled,i})}$$

$NYU_{cond}$ $$\frac{U_{cond} A_{cond}/N_2}{\dot{m}_{cond} c_p(T_{c,i})}$$

$NTU_{heating}$ $$\frac{U_{heating} A_{bed}/N}{\dot{m}_{heating} c_p(T_{h,i})}$$

p pressure (Pa)
$P_{cond}$ condenser pressure (Pa)
$P_{evap}$ evaporator pressure (Pa)
$P_{sat}$ saturated vapour pressure (Pa)
R universal gas constant (Jmol$^{-1}$K$^{-1}$ or Jkg$^{-1}$K$^{-1}$)
$P_p$ average radius of silica gel (m)
t time (s)
$t_{cycle}$ cycle time (s)
$t_{sw}$ switching time (s)
T temperature (K or ° C.)
$T_{bed,I}$ bed I temperature (K or ° C.)
$T_{c,i}$ coolant water inlet temperature to the condenser (K or ° C.)
$T_{chilled,i}$ chilled water inlet temperature to the evaporator K or ° C.)
$T_{chilled,o}$ chilled water outlet temperature from the evaporator (K or ° C.)
$T_{cond}$ condenser temperature (K or ° C.)
$T_{evap}$ evaporator temperature (K or ° C.)

$T_{h,i}$ waste heat supply temperature to the chiller (K or ° C.)
$T_i$ temperature of fluid within a discrete element i in the heat exchanging tube (K or ° C.)
$T_{ref}$ refrigerant temperature (K or ° C.)
$T_{sg}$ silica gel temperature (K or ° C.)
$\overline{T}$ $$\frac{T - T_{c,i}}{T_{h,i} - T_{c,i}}$$

$U_{cooling}$ adsorber heat transfer coefficient (Wm$^{-2}$K$^{-1}$)
$U_{heating}$ desorber heat transfer coefficient (Wm$^{-2}$K$^{-1}$)
$U_{chilled}$ evaporator heat transfer coefficient (Wm$^{-2}$K$^{-1}$)
$U_{cond}$ condenser heat transfer coefficient (Wm$^{2K-1}$)
$V_{x-tube}$ volume of fluid within the heat exchanging tube of component x, where x could be the bed, evaporator, or condenser (m$^3$)
$\beta_{cond}$ $$\frac{M_{cond} c_{p,cond}}{M_{sg} c_{p,sg}}$$

$\beta_{evap}$ $$\frac{M_{evap} c_{p,evap}}{M_{sg} c_{p,sg}}$$

$\beta_{Hex}$ $$\frac{M_{Hex} c_{p,Hex}}{M_{sg} c_{p,sg}}$$

$\beta_{ref}$ $$\frac{M_{ref} c_{p,ref}}{M_{sg} c_{p,sg}}$$

$\beta_{x-tube,i}$ $$\frac{\rho(T_i) V_{x\_tube} c_p(T_i)/N_x}{M_{sg} c_{p,sg}};$$

if x refers to the bed, $N_x = N$, if x refers to the evaporator and condenser, $N_x = N_1$ and $N_x = N_2$ respectively
$\delta_I, \theta_I$ flags governing the transient operation of bed I
$\Delta H_{ads}$ isosteric heat of adsorption
$\overline{\Delta H}_{ads}$ $$\frac{\Delta H_{ads}}{c_{p,sg}(T_{h,i} - T_{c,i})}$$

η conversion efficiency, ratio of cycle averaged cooling capacity to the enthalpy of waste heat stream relative to the environment $\tau$ $t/t_{cycle}$ $\omega$ $\dfrac{\dot{m}_{cooling} t_{cycle}}{M_{sg}}$ $\omega_{sw}$ $\dfrac{\dot{m}_{cooling} t_{sw}}{M_{sg}}$

We claim:

1. A regenerative adsorption process for application in an adsorption assembly comprising a condenser, an evaporator and a plurality of reactors each alternately operating in adsorption and desorption modes, said process comprising:
   passing a coolant through the condenser;
   passing the coolant through reactors operating in adsorption mode before, after or simultaneous with the passing of the coolant through the condenser; and
   passing waste heat from a waste heat source through reactors operating in desorption mode; wherein said plurality of reactors are scheduled such that each reactor alternately operates in adsorption and desorption modes for substantially identical time intervals, and such that each reactor has an equal chance of being the first reactor to receive the coolant emanating from the condenser when operating in adsorption mode, and the waste heat from the waste heat source when operating in desorption mode.

2. A process according to claim 1, further comprising the step of arranging said reactors operating in adsorption mode in one of series and parallel.

3. A process according to claim 1, wherein said plurality of reactors comprises an even number of reactors, further comprising the step of operating at substantially any instant during said process half of said plurality of reactors in adsorption mode and the other half of said plurality of reactors in desorption mode.

4. A process according to claim 3, further comprising the step of providing at least four reactors.

5. A process according to claim 4, further comprising the step of providing six reactors.

6. A process according to claim 1, further comprising the step of flowing the coolant through said reactors operating in adsorption mode at a flow rate which provides a transition or turbulent flow regime in the channel of a heat exchanger.

7. A process according to claim 1, further comprising the step of flowing the waste heat through said reactors operating in desorption mode at a predetermined flow rate.

8. A process according to claim 1, further comprising the step of flowing the coolant through said condenser at a predetermined flow rate.

9. A process according to claim 1, wherein said step of passing the coolant through the reactors operating in adsorption mode further comprises the step of passing the coolant emanating from the condenser through the reactors operating in adsorption mode.

10. A process according to claim 1, wherein reactors operating in adsorption mode switch to operation in desorption mode at different times and reactors operating in desorption mode switch to operating in adsorption at different times.

11. A multi-reactor regenerative adsorption chiller assembly comprising:
    a condenser adapted to receive a coolant from a source;
    an evaporator connected to said condenser to provide a refrigerant circuit;
    a plurality of reactors, each being able to operate in adsorption and desorption modes and having a coolant inlet to directly or indirectly receive coolant when operating in adsorption mode before, after or simultaneous with the condenser, and a waste heat inlet for directly or indirectly receiving waste heat from a waste heat source when operating in desorption mode; and
    control means for controlling said plurality of reactors such that each reactor alternately operates in adsorption and desorption modes for substantially identical time intervals, and such that each reactor has an equal chance of being the first reactor to receive the coolant when operating in adsorption mode, and the waste heat from the waste heat source when operating in desorption mode.

12. An assembly according to claim 11, wherein said plurality of reactors are arranged in series such that, in use, reactors operating in adsorption mode constitute a first sub-series of reactors connected to receive the coolant, and reactors operating in desorption mode constitute a second sub-series of reactors connected in series to receive waste heat from said waste heat source.

13. An assembly according to claim 12, wherein said plurality of reactors indirectly or directly receive coolant emitted from said condenser.

14. An assembly according to claim 12, wherein the first sub-series of reactors are connected in series.

15. An assembly according to claim 12, wherein the first sub-series of reactors are connected in parallel.

16. An assembly according to claim 11, wherein said plurality of reactors comprises an even number of reactors, and wherein in use at substantially any instant half of said plurality of reactors operate in adsorption mode and the other half of said plurality of reactors operate in desorption mode.

17. An assembly according to claim 16, wherein said plurality of reactors comprises at least four reactors.

18. An assembly according to claim 11, wherein each of said plurality of reactors is composed of a heat exchanging material and contain an adsorbent, that binds adsorbate by at least one of physi-sorption and chemi-sorption.

19. An assembly according to claim 18, wherein said adsorbent comprises silica gel.

20. An assembly according to claim 11, wherein said plurality of reactors indirectly or directly receive coolant emitted from said condenser.

21. An assembly according to claim 11, wherein reactors operating in adsorption mode switch to operation in desorption mode at different times and reactors operating in desorption mode switched to operating in adsorption at different times.

* * * * *